2,465,070

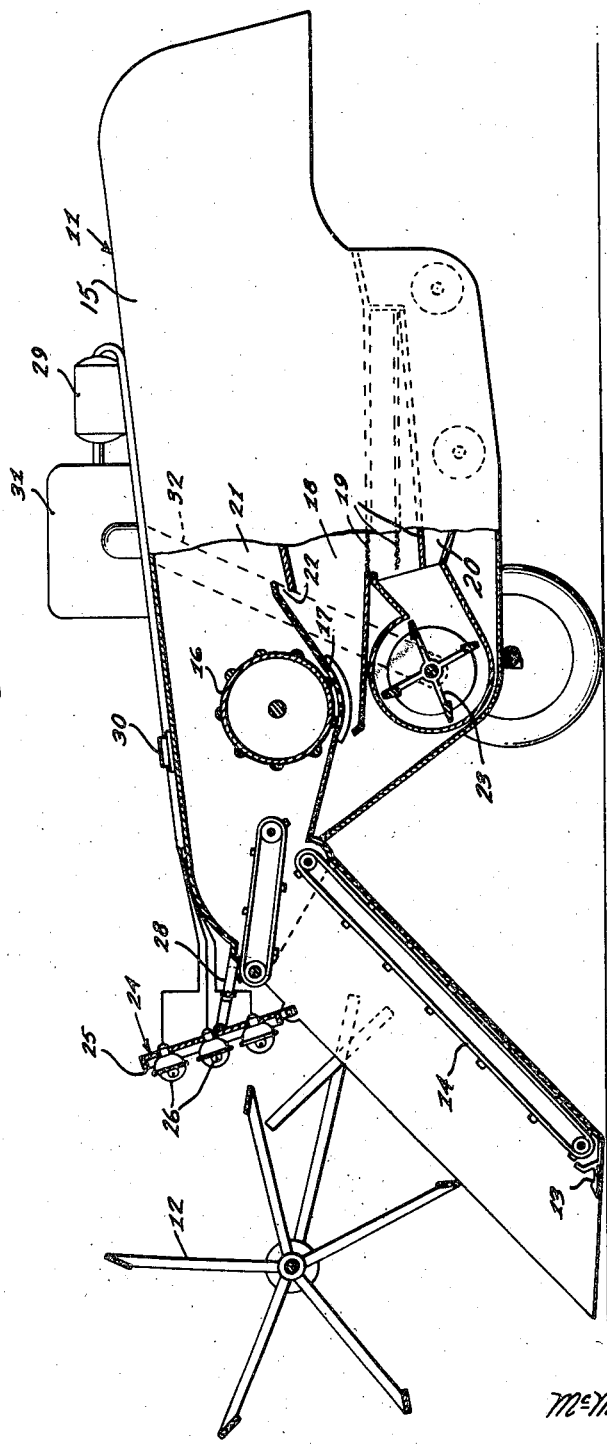
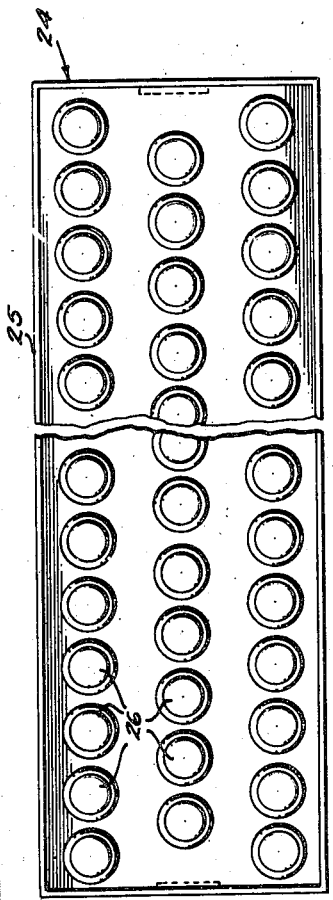
INVENTOR.
HIRAM J. DEMUTH

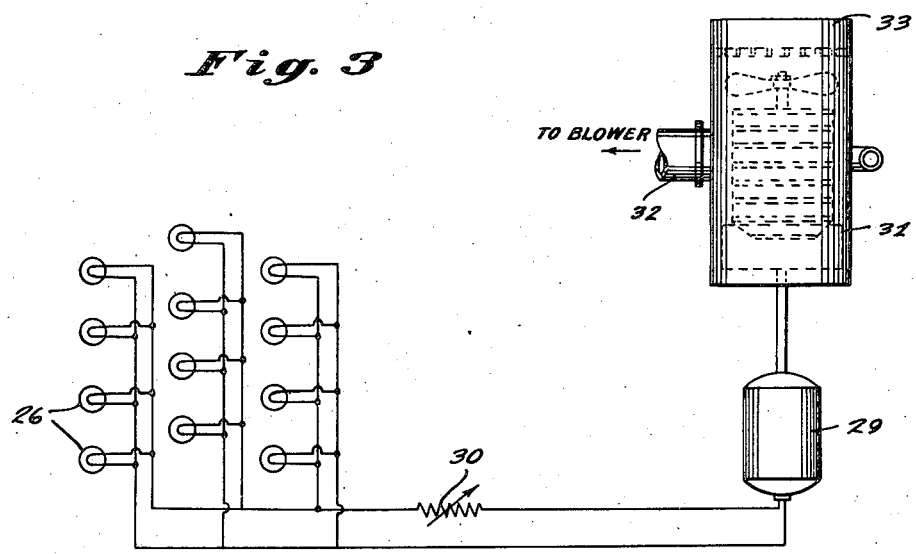
Fig. 3
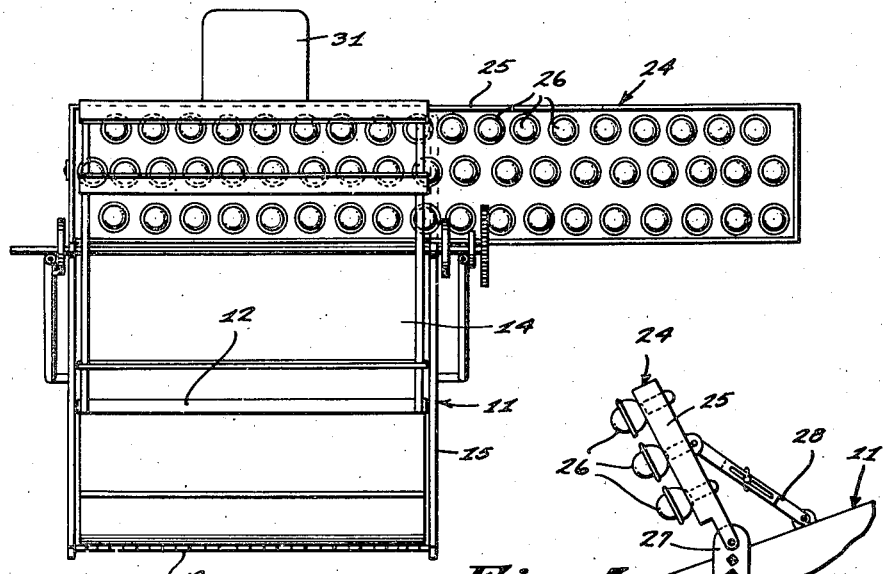
Fig. 4
Fig. 5
INVENTOR.
HIRAM J. DEMUTH
BY
McMorrow, Berman + Davidson
ATTORNEYS Patented Mar. 22, 1949

UNITED STATES PATENT OFFICE 2,465,070

WHEAT DRIER FOR COMBINES

Hiram J. Demuth, Enid, Okla.

Application October 28, 1947, Serial No. 782,656

3 Claims. (Cl. 56—20)

This invention relates to harvesting machines, and more particularly to a drying attachment for wheat combines.

A main object of the invention is to provide a novel and improved drying attachment for combines which employs infra red radiation or the like as the drying means, whereby the moisture content of wheat may be controlled as it is being cut by the combine.

During harvesting operations, especially when carried on after sunset, the air becomes damp and the wheat absorbs moisture therefrom. This makes it difficult to cut without a great loss. By the use of the present invention, harvesting operations may be successfully performed after sunset and also on damp days.

A further object of the invention is to provide an improved means of directing heat from the generating set for the infra red radiator so that heat from the radiator, cylinder block and exhaust manifold of the engines thereof can be transferred into the combine blower, thereby causing warm, dry air to be blown inside of the combine and aiding to further dry the wheat being harvested.

Further objects and advantages of the invention will become apparent from the following description and claims, and from the acompanying drawings, wherein:

Figure 1 is an elevational view, partly in cross-section, of a wheat combine provided with wheat-drying means in accordance with the present invention.

Figure 2 is a front elevational view of an infra red radiator employed in the combine of Figure 1.

Figure 3 is a diagram showing a generator connected to the electrical circuit of the infra red radiator, said generator having a prime mover which also furnishes heat for drying the wheat being harvested.

Figure 4 is a front end view of the combine of Figure 1.

Figure 5 is a side elevational detail view of the infra red radiator, showing a means for adjusting its angular position.

Referring to the drawings, 11 designates a wheat combine of generally conventional construction, said combine being provided at its forward end with the usual harvesting reel 12, the sickle bar 13, a separator 15 disposed rearwardly of the sickle bar and an elevator 14 between the sickle bar and the separator. The separator includes the usual rasp cylinder 16 which threshes out the kernels of grain or seed from the stalk material fed to it by the elevator 14 and advances the grain or seed through a grate 17 into a space 18 from which the grain or seed drops through screens 19 into a space 20. From space 20 the grain or seed is fed by suitable means, not shown, to a receptacle, such as a storage bin. The action of the rasp cylinder 16 causes the bulk of the seed or grain to be separated from the straw, which passes into a space, shown at 21, where it is vibrated by means, not shown, thereby loosening the remaining seed or grain adhering thereto, the additional seed or grain falling into the space 18 through openings such as shown at 22. Along with the seed or grain, chaff and other light waste material fall into the space 18. This chaff and other light waste material is separated from the seed or grain by a blower, shown at 23, which directs a blast of air rearwardly through the space 18 and blows the light waste material to a discharge outlet at the rear end of the machine, allowing the heavier kernels of grain or seed to fall into the space 20. The structure thus far described is conventional.

Mounted on the separator above the elevator 14 is a bank of infra red lamps, indicated generally at 24, which is positioned to direct heat from the lamps onto grain adjacent to and immediately ahead of the sickle bar. This bank of infra-red lamps extends transversely of the elevator for the entire width thereof and projects laterally of the elevator at one side for an additional distance substantially equal to the width of the elevator, so that the lamp bank simultaneously radiates heat not only on the row being harvested, but on the next row to be subsequently harvested. As shown in Figure 5, the lamp bank comprises a suitable elongated frame 25 in which the lamps 26 are carried, said frame being adjustably mounted at the front end of the separator by lugs 27 extending upwardly from the elevator frame. Links 28 connect the intermediate portions of the frame 25 to the separator housing, said links being adjustable in length so that the angle of inclination of the support 25 may be readily varied.

Mounted on the top af the separator housing is an electric current generator 29 which furnishes current to the lamps 26 through a rheostat 30 which is employed to vary the intensity of the infra red radiation. Generator 29 is driven by a gasoline engine 31, also mounted on the top of the separator housing. The engine 31 is enclosed in a housing which is connected by a duct 32 to the intake of blower 23. One end 33 of the housing of engine 31 is substantially open so that air may be drawn into the engine housing, and may be drawn into duct 32 after extracting heat from the radiator, exhaust manifold and cylinder block of the engine. The heated air is propelled by blower 23 through the space 18 and acts to further dry the grain or seed falling through said space.

In operation, the lamp bank 24 is adjusted to an angle whereby the radiation from the infra red lamps 26 falls on the wheat being cut, as well as on the next adjacent row, as above described. The moisture content of the wheat is thus reduced to a value suitable for efficient cutting. After the wheat is cut and the kernels are separated therefrom, the kernels are further dried by the warm dry air blown inside the machine by blower 23. In this manner the moisture content of the harvested wheat is reduced to a desired value, while the wheat being cut is also dried to maintain the combine at full operating efficiency. By the use of the drying means above described, it is thus possible to cut wheat efficiently after sundown and on damp days, as well as under more favorable conditions.

The adjustable links 28 make it possible to direct the infra red radiation on the wheat in front of the reel 12, on the wheat being cut at the sickle 13, or at other desired areas in advance of the machine.

While a specific embodiment of a drying apparatus for wheat combines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a mobile grain harvester having a grain cutting sickle bar, a separator disposed rearwardly of said sickle bar, an elevator between said sickle bar and said separator, and a blower in said separator, means for drying grain harvested by said harvester comprising a lamp supporting frame adjustably secured to said separator adjacent said elevator and extending transversely across the latter, a plurality of heat radiating lamps carried by said frame and directed toward said sickle bar to direct heat upon the grain adjacent to and immediately ahead of said sickle bar, an electric current generator mounted on said separator, means including an adjustable rheostat electrically connecting said heat radiating lamps with said generator, an internal combustion engine mounted on said separator and drivingly connected to said generator, a housing enclosing said engine and having an air intake opening therein, and an air duct connecting said engine housing to said blower for conducting engine heated air to said blower for application to grain in said separator.

2. In combination with a mobile grain harvester having a grain cutting sickle bar, a separator disposed rearwardly of said sickle bar, an elevator between said sickle bar and said separator, and a blower in said separator, means for drying grain harvested by said harvester comprising a lamp supporting frame adjustably secured to said separator adjacent said elevator and extending transversely across the latter, a plurality of heat radiating lamps carried by said frame and directed toward said sickle bar to direct heat upon the grain adjacent to and immediately ahead of said sickle bar, an electric current generator mounted on said separator, means including an adjustable rheostat electrically connecting said heat radiating lamps with said generator, an internal combustion engine mounted on said separator and drivingly connected to said generator, a housing inclosing said engine and having an air intake opening therein, and an air duct connecting said engine housing to said blower for conducting engine heated air to said blower for application to grain in said separator, said lamp supporting frame also extending laterally beyond one side of said elevator, and a plurality of forwardly directed, heat radiating lamps carried by said laterally extending frame portion and electrically connected to said generator.

3. In combination with a mobile grain harvester having a grain cutting sickle bar, a separator disposed rearwardly of said sickle bar, and an elevator between said sickle bar and said separator, grain drying means comprising an elongated frame adjustably mounted on said separator above said elevator and extending transversely across said elevator and laterally beyond one side of the latter, a plurality of forwardly directed, heat radiating lamps carried by said frame for directing heat upon grain adjacent to and immediately ahead of said sickle bar and at said one side of said elevator, an electric current generator mounted on said separator, means including an adjustable rheostat electrically connecting said heat radiating lamps to said generator, and an internal combustion engine mounted on said separator and drivingly connected to said generator.

HIRAM J. DEMUTH.

REFERENCES CITED

The following references are of record in the file of this patent:

UNITED STATES PATENTS

| Number | Name | Date |
|---|---|---|
| 1,255,982 | Byers | Feb. 12, 1918 |
| 2,285,117 | Johnson et al. | June 2, 1942 |
| 2,355,671 | Naeher et al. | Aug. 15, 1944 |
| 2,397,363 | McLeod | Mar. 26, 1946 |
| 2,402,449 | Rockwell | June 18, 1946 |

FOREIGN PATENTS

| Number | Country | Date |
|---|---|---|
| 321,452 | Great Britain | 1929 |

OTHER REFERENCES

W. H. Cashmore, "The Drying of Farm Crops." Chemistry and Industry, page 278, July 24, 1943.

John E. Nicholas, "Some Preliminary Investigations on Dehydration of Fruits and Vegetables with Infrared Energy," page 285, Journal of the Franklin Institute, September, 1943.